United States Patent [19]

Stepe

[11] 3,997,989
[45] Dec. 21, 1976

[54] TIP RETAINING MEANS WITH ROTATIVE LOCKING TENDENCIES

[75] Inventor: Visvaldis A. Stepe, Willow Springs, Ill.

[73] Assignee: Caterpillar Tractor Co., Peoria, Ill.

[22] Filed: Oct. 2, 1974

[21] Appl. No.: 511,232

[52] U.S. Cl. .................... 37/142 A; 24/218; 85/5 N; 85/8.8; 277/164; 279/97; 299/92; 403/318

[51] Int. Cl.² ............... E02F 9/28; F16B 21/07; F16B 21/18

[58] Field of Search ............... 37/142 A; 299/92; 85/8.3, 8.6, 8.8, 8.9, 5 N, 5 R; 279/97, 86; 403/203, 318, 408, 154, 155; 277/164; 24/218

[56] References Cited

UNITED STATES PATENTS

| 908,429 | 12/1908 | Tobey | 85/8.8 X |
|---|---|---|---|
| 968,036 | 8/1910 | Erickson | 85/8.8 |
| 2,162,167 | 6/1939 | Greterman | 85/8.8 |
| 2,385,565 | 9/1945 | Cox | 85/8.8 X |
| 2,657,482 | 11/1953 | Launder et al. | 85/8.3 X |
| 2,774,430 | 12/1956 | Blazek | 403/318 X |
| 2,957,717 | 10/1960 | Bram | 277/164 X |
| 3,107,409 | 10/1963 | Arthaud et al. | 24/218 |
| 3,217,774 | 11/1965 | Pelochino | 85/8.8 X |
| 3,226,133 | 12/1965 | Geresy | 85/8.1 |
| 3,410,010 | 11/1968 | Ratkowski | 37/142 A |
| 3,445,120 | 5/1969 | Barr | 277/164 |
| 3,690,728 | 9/1972 | Krekeler | 299/92 |
| 3,740,876 | 6/1973 | Solokhin et al. | 37/142 A |
| 3,801,210 | 4/1974 | Heinold et al. | 403/318 |

FOREIGN PATENTS OR APPLICATIONS

| 976,239 | 3/1951 | France | 85/8.8 |
|---|---|---|---|
| 389,065 | 1/1924 | Germany | 24/218 |
| 2,015,662 | 11/1970 | Germany | 37/142 A |
| 815,428 | 8/1951 | Germany | 85/8.8 |
| 448,621 | 4/1968 | Switzerland | 85/8.8 |

Primary Examiner—Clifford D. Crowder
Assistant Examiner—Steven A. Bratlie
Attorney, Agent, or Firm—Phillips, Moore, Weissenberger, Lempio & Strabala

[57] ABSTRACT

Retaining means for an earthworking tip member including a wire spring member bonded into a washer shaped member of resilient material. The means also include a partially cylindrical partially flat surfaced retaining bar member having grooves for receiving portions of the wire spring member within the open central portion of the washer shaped resilient member. The resilient member is received within a recessed portion of an adapter or shank upon which the earthworking tip member is retained. Upon engagement with the grooves in the bar member, the wire spring means and the resilient member tend to rotate the retaining bar to lock the bar member in place from firm retention of the tip member during use. The retention means is also selectively releasable when desired for removal thereof and release of the tip member.

8 Claims, 4 Drawing Figures

U.S. Patent  Dec. 21, 1976  3,997,989
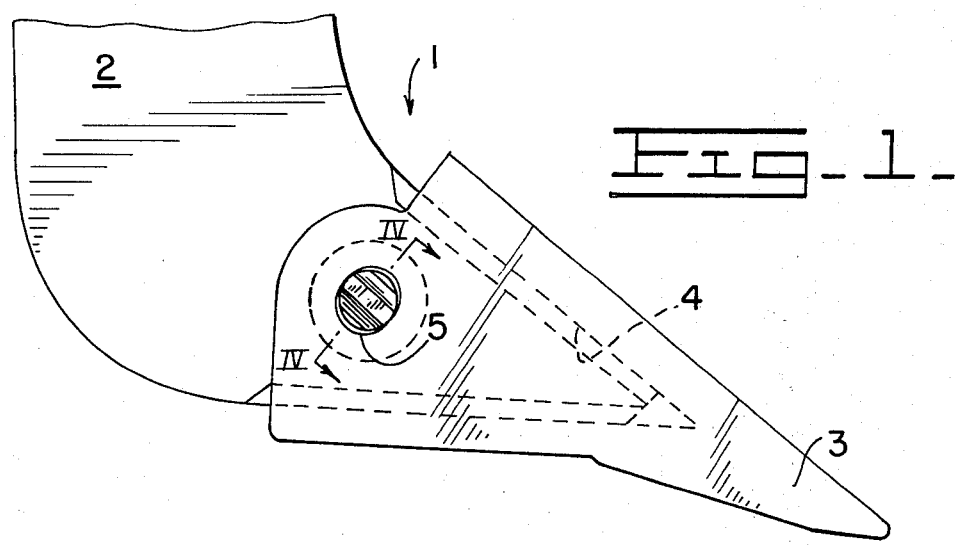
Fig_1_
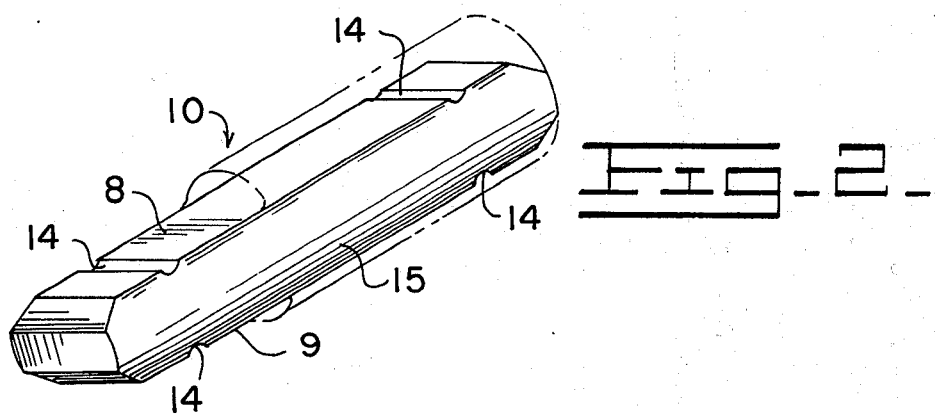
Fig_2_
Fig_4_   Fig_3_
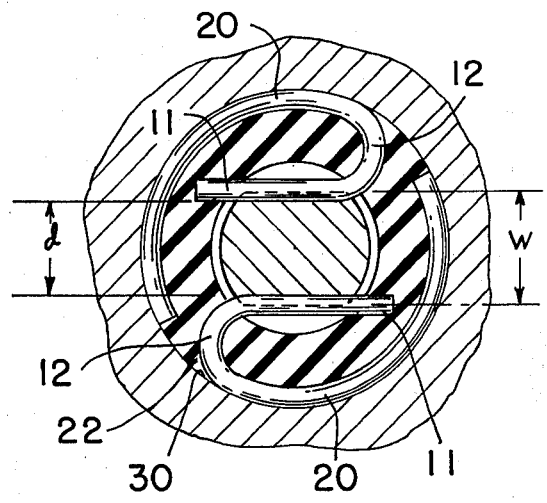
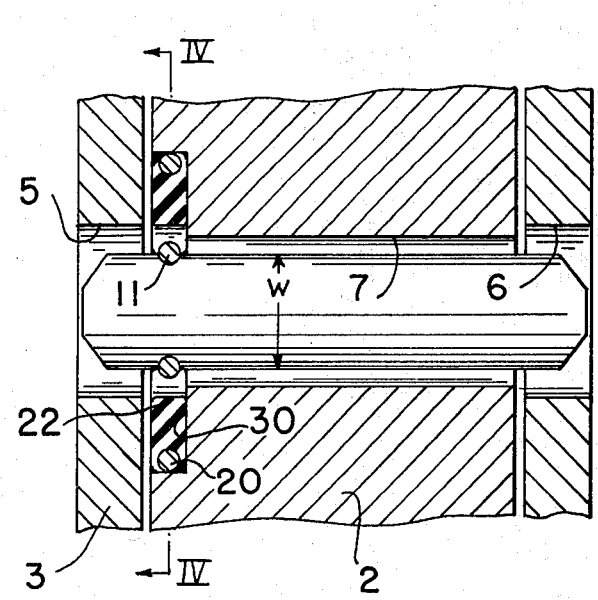

TIP RETAINING MEANS WITH ROTATIVE LOCKING TENDENCIES

CROSS REFERENCE TO RELATED APPLICATIONS

This invention relates to the invention disclosed in U.S. patent application Ser. No. 188,016, now U.S. Pat. No. 3,801,210 to L.K. Heinhold et al., entitled: WIRE CLIP RETAINING MEANS FOR TIP RETAINING PIN, of common assignment herewith.

BACKGROUND OF THE INVENTION

This invention relates to a retaining system for ground working tip members which tip members must be securely held during use but which must be readily replacable in the field, when desired. Such tip members are used in earthworking apparatus such as rippers, bulldozer edges, and the like.

It is generally desirable to positively retain such ground-working tip members on their associated adapters in use. Without such positive retention, possible loss of such tip members could result in severe damage to the supporting adapter or to other equipment, such as a rock crusher should an errant tip member find its way into the expensive mechanism thereof.

The earthworking tip member must also be readily removable and installation must be possible in the field by means of simple tools such as a hammer and drift pin.

Cost is another factor which must be considered in providing retaining means for such tip members. Because of frequent handling and replacement, retaining means must be economically manufactured, without a sacrifice in retention capability and with a minimum of special tooling for the adapter and earthworking tip member associated with the means. Retaining means may be economically produced if designed so that the essential retaining parts are not load carrying members in use. That is, without provision for the heavy axial and lateral forces generally imposed upon earthworking tip members, the retaining means need not be especially strong and can be made from lighter structural material.

In the past, attempts have been made to provide retaining means which could simultaneously fulfill all the above-mentioned criteria. Examples of such attempts are found in the aforementioned U.S. Pat. No. 3,801,210 to Heinhold et al. However, the Heinhold systems and other prior art devices utilize wire clip retaining members which exert forces upon a retaining bar member or the like which are essentially normal to the surfaces of such bar member. It has now been found that superior retention capacity is obtained by means of a particularly designed spring system which, in concert with a bonded resilient support member, tends to rotate toward a secondary locking position once positioned within the adapter recess.

SUMMARY OF THE INVENTION

The instant earthworking tip retaining system comprises a retaining and locking means which provides positive retention of the ground engaging tip member upon a supporting adapter. Spring means, bonded within a resilient member are mounted within a recess in the adapter and function to firmly but releasably retain a tip supporting bar member within an aperture in the adapter member. The resiliently bonded spring means tend to rotate when in place within the adapter recess toward a secondary locking position different from the normal installation position for enhanced retention capability.

BRIEF DESCRIPTION OF THE DRAWING

FIG. 1 is a partial elevation of a ripper adapter or shank member with an earthworking tip mounted thereupon by means of the subject retaining device;

FIG. 2 is an enlarged isometric view of the retention bar member of the present invention;

FIG. 3 is a sectional view taken along the line III—III of FIG. 1; and

FIG. 4 is an enlarged sectional view taken along the line IV—IV of FIG. 3.

DETAILED DESCRIPTION

With reference to the drawing, the instant retention means is shown generally at 1. A shank or adapter member of an earthworking ripper device is shown at 2. Mounted upon a conical or wedge-shaped nose portion of the adapter is an earthworking tip member 3 which is conventionally provided with a wedge-shaped socket portion 4 which is telescopically received over the nose portion of the adapter member.

The tip member 3 is provided with a pair of aligned apertures 5 and 6 which, when the tip is mounted upon the adapter member, are aligned with a transpiercing bore 7 in the adapter member. The inventive retention means for the tip is adapted for disposition concurrently within the bore 7 and the apertures 5 and 6.

The retention means 1 include an elongated retainer bar member 10 which has a pair of opposed flat surfaces 8 and 9 and a pair of contiguous rounded surfaces 15, only one of which may be seen in FIG. 2. Each of the flat surfaces 8 and 9 are provided with laterally extending grooves 14, the purpose of which will become apparent hereinafter. If it is desired to provide more bearing surface between the bar member and the tip member 3, one end of the bar member can be made continuously round, as shown by the phantom line detail in FIG. 2.

The retention means also include spring means which comprise a pair of wire spring members 20. Each of such spring member includes a straight section 11 and a curved section 12. Due to the design of the spring members, the effective spring rates of the sections 11 and 12 are different; the straight section 11 being relatively easily defectable and the curved section 12 being relatively stiff. The spring members 20 are bonded within a washer-shaped member 22 fabricated from resilient material such as rubber, firm plastics or the like. The washer-shaped member 22 is operatively receivable within a recess 30 in the adapter member 2 which is concentrically disposed with respect to the bore 7, as shown.

When it is desired to install and retain the tip member 3 upon the adapter member 2, the bonded unitary spring 20 and washer member 22 system is placed within the recess 30 of the adapter member 2. The tip member 3 is then installed upon the adapter member so that the apertures 5 and 6 are aligned with the bore 7. The retainer bar member 10 is then driven into the bore 7 until the grooves 14 engage the straight sections 11 of the spring members 20. When in place, the retainer bar member 10 interacts with the apertures 5 and 6 and prevents the tip member 3 from disloging from the adapter member 2.

With particular reference to FIG. 4, the novel rotative locking feature of the present invention may be readily appreciated. As previously discussed, the curved sections 12 of the springs are relatively stiff as compared to the straight sections 11. Consequently, straight sections will deflect before the curved sections. Assisting this tendency is the support given the curved sections 12 by the recess 30 of the adapter member.

When in place within the grooves 14, the straight sections 11 of each of the spring members are disposed in parallel relation a distance $d$ apart. The distance between the flat sections 8 and 9 of the retaining bar member 10, however, is a distance "W" which is greater than the distance $d$. The combined depth of the grooves 14 is equal to the difference between the distances W and $d$. When, therefore, the bar member 10 is inserted between the straight sections 11, such sections deflect to the secondary positions shown by the dotted lines in FIG. 4 so that the bar member may pass therebetween. As the spring sections deflect, the bar member rotates so that the flat surfaces thereof remain parallel with the straight sections of the spring members. This forced rotation continues during axial movement of the bar member until the straight sections 11 are seated firmly within the grooves 14 whereupon the spring sections and the bar member may return to substantially their original positions.

Upon removal of the bar member 10 from the bore 7, such rotation must again occur. This rotative tendency assures the firm retention of the straight sections 11 within the grooves 14 and requires the additional loading of the spring members 20 before the straight sections of the springs can be placed within or removed from the grooves 14.

While the invention has been described with respect to a specific embodiment thereof, it will be apparent that modifications and variations are possible within the spirit of the inventive concepts. No limitations with respect to such variations and modifications are intended except those required by the scope of the appended claims.

I claim:

1. A bar member, and a bar member retaining means for releasably securing the position of said bar member comprising;

a resilient member having a bar member receiving opening therethrough, bar member engaging spring means resiliently supported within said resilient member and having opposed portions extending at least partially into said bar member receiving opening, said bar member engaging spring means operatively exerting oppositely directed holding forces upon said bar member, said bar member being elongated and at least partially cylindrically shaped, said bar member having a first portion and having a second grooved portion axially spaced apart from said first portion and having a lesser cross sectional dimension than said first portion, at least the portions of said spring means extending into said bar member receiving opening and said bar member assuming first predetermined positions relative the resilient member when in operative engagement with said first portion of said bar member, and means for determining the deflection of said portions of said spring means so that said portions of said spring means and said bar member assume second predetermined positions relative to the resilient member which are angularly displaced in the same relative direction about the axis of said resilient member from said first predetermined positions when said spring portions are in operative engagement with said second groove portion of said bar member.

2. The invention of claim 1 wherein said spring means include at least one spring member having a curved portion and having a straight portion formed to engage said second grooved portion of said bar member.

3. The invention of claim 2 wherein said resilient member is a washer shaped element of resilient material having two opposed flat sides and a circular edge.

4. The invention of claim 2 wherein said bar member is elongated and has two opposed flat surfaces and two contiguous opposed cylindrical surfaces, said second grooved portion including a pair of laterally extending aligned grooves one in each of said two opposed flat surfaces.

5. The invention of claim 4 wherein there are two spring members, and wherein said straight portions extend in parallel relationship within said bar member receiving opening of said resilient member, said straight portions of said spring members being normally spaced apart from one another by a first predetermined distance.

6. The invention of claim 5 wherein said two opposed flat surfaces are spaced apart from one another by a second predetermined distance which is greater than said first predetermined distance.

7. The invention of claim 6 wherein said pair of laterally extending grooves are cut into said two opposed flat surfaces such that the bottom of each groove is parallel with respect to the bottom of the other groove, with the distance between the respective parallel bottoms equal to said first predetermined distance.

8. A means for retaining an earthworking tip member upon an adapter member including a retainer bar member having flat parallel opposite side surfaces and contiguous curved surfaces separating said side surfaces, groove means in said flat parallel surfaces, aligned retainer bar member receiving bore means and aperture means in said adapter member and in said tip member respectively, a section member of resilient material coaxially mounted along said bore means within a hollow recess portion of said adapter member, a retainer bar member receiving opening in said section member, retainer bar member engaging means resiliently supported in said section member and having opposed portions extending partially into said bar member receiving opening, said bar member engaging means operatively exerting equal and oppositely directed forces upon said retainer bar member, said retainer bar member and at least the portions of the retainer bar member engaging means extending into the retainer bar member receiving opening assuming first predetermined positions relative the section member when in operative engagement with the flat parallel opposite side surfaces of the retainer bar member, and means for determining the deflection of said portions of said retainer bar member engaging means so that said portions of said bar member engaging means and said bar member assume second predetermined positions relative the section member which are angularly displaced in the same relative direction about the axis of said section member from said first predetermined position when said portions of the retainer bar member engaging means are in operative engagement with the groove means of the retainer bar member.

* * * * *

UNITED STATES PATENT AND TRADEMARK OFFICE
CERTIFICATE OF CORRECTION

PATENT NO. : 3,997,989
DATED : December 21, 1976
INVENTOR(S) : Visvaldis Alfons Stepe It is certified that error appears in the above–identified patent and that said Letters Patent are hereby corrected as shown below:

In Figure 1 of the drawings, the section line denoted "IV-IV" should read "III-III."

Signed and Sealed this

Fourteenth Day of June 1977

[SEAL]

Attest:

RUTH C. MASON
*Attesting Officer*

C. MARSHALL DANN
*Commissioner of Patents and Trademarks*